United States Patent
Hessler et al.

(10) Patent No.: US 10,582,406 B2
(45) Date of Patent: Mar. 3, 2020

(54) SELF-CONTAINED SCHEDULED MOBILITY MEASUREMENT SIGNALS

(71) Applicant: Telefonaktiebolaget LM Ericsson (publ), Stockholm (SE)

(72) Inventors: Martin Hessler, Linköping (SE); Pål Frenger, Linköping (SE); Jonas Fröberg Olsson, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/092,029

(22) PCT Filed: Apr. 20, 2016

(86) PCT No.: PCT/EP2016/058724
§ 371 (c)(1),
(2) Date: Oct. 8, 2018

(87) PCT Pub. No.: WO2017/182067
PCT Pub. Date: Oct. 26, 2017

(65) Prior Publication Data
US 2019/0098525 A1 Mar. 28, 2019

(51) Int. Cl.
*H04W 24/10* (2009.01)
*H04L 1/20* (2006.01)
*H04L 5/00* (2006.01)
*H04W 8/02* (2009.01)

(52) U.S. Cl.
CPC .............. *H04W 24/10* (2013.01); *H04L 1/20* (2013.01); *H04L 5/0048* (2013.01); *H04W 8/02* (2013.01)

(58) Field of Classification Search
None
See application file for complete search history.

(56) References Cited

U.S. PATENT DOCUMENTS

| | | | |
|---|---|---|---|
| 2010/0322097 A1* | 12/2010 | Jen | H04L 1/1854 370/252 |
| 2012/0258515 A1 | 10/2012 | Hugl et al. | |
| 2014/0301301 A1* | 10/2014 | Cheng | H04L 5/0048 370/329 |

(Continued)

*Primary Examiner* — Brian S Roberts
(74) *Attorney, Agent, or Firm* — Sage Patent Group

(57) ABSTRACT

To provide a more efficient approach to mobility measurement in a radio access network there is provided a method of performing a mobility measurement in a wireless device operating in a radio access network. There is received (S10) a mobility measurement resource assignment identifying one or more demodulation and mobility reference signals of a pre-determined set of demodulation and mobility reference signals. The mobility measurement resource assignment is demodulated (S14) using the one or more demodulation and mobility reference signals of the predetermined set of demodulation and mobility reference signals. Also, there are determined (S14) one or more mobility measurement quality values from the identified one or more demodulation and mobility reference signals. Further aspects of the present invention related to a method in a network node of a radio access network, a wireless device adapted to perform a mobility measurement, to a network node for a radio access network, to computer programs and to computer program products.

20 Claims, 12 Drawing Sheets

(56) References Cited

U.S. PATENT DOCUMENTS

2015/0009948 A1\* 1/2015 Raaf .................... H04L 5/0048
370/330
2015/0092582 A1 4/2015 Liao et al.
2016/0277081 A1\* 9/2016 Wei ....................... H04L 5/0051

\* cited by examiner

SELF-CONTAINED SCHEDULED MOBILITY MEASUREMENT SIGNALS

TECHNICAL FIELD

The present invention relates to a method of performing mobility measurement in a wireless device operating in a radio access network, to a related wireless device, to a method of performing mobility measurement in a network node of a radio access network, to a related network node, and to related computer programs and computer program products.

BACKGROUND

In many wireless communication networks Reference Signals RSs for demodulation of control and data signals are needed in order to obtain good performance. In LTE the so-called Cell-specific Reference Signals CRS were originally used as demodulation RSs for both the PDSCH Physical Downlink Shared Channel, i.e. the data channel, and the PDCCH Physical Downlink Control Channel, i.e., the control channel. The PDCCH is used to transmit a downlink transmission assignment and an uplink transmission assignment (which is typically called an UL grant) from an eNB to an User Equipment UE where the downlink assignments assigns a transmission on the PDSCH destined to the UE. It is noted that the CRS may also be used for mobility purposes in that the wireless device may perform mobility measurement using the CRS.

Further, pre-coding is a well-known technique to adopt a transmitted signal so that the received signal becomes stronger in a decoding sense. The LIE standard quite early supported closed-loop pre-coding wherein the UE reports a suggested pre-coder for the PDSCH. In TM4 Transmission Mode 4 the PDSCH is demodulated using CRCs that are not pre-coded, i.e. at least not dynamically. This means that the pre-coder used by the eNB for the PDSCH transmission needs to be communicated to the UE. The solution is that pre-coder used is signaled inside the Downlink Control Information DCI send over the PDCCH.

Further, in Rel-10 of the 3GPP Third Transmission Partnership Project specifications TM9 Transmission Mode 9 was introduced, and demodulation of the PDSCH was using new reference signals that where pre-coded in the same way as the PDSCH. These reference signals are called Channel State Information-Reference Signals (CSI-RS). With TM9 there was hence no longer a need to explicitly signal to the UE what pre-coder was used.

Further, in Rel-11 the Evolved PDCCH EPDCCH that enabled dynamic pre-coding of also the channel used for sending assignments, i.e. DCIs, to the UE. However, the EPDCCHs has the restriction that the demodulation reference signals are common for all the EPDCCHs meaning that the pre-coding cannot be optimized for each UE receiving an EPDCCH since all the EPDCCHs are using the same demodulation RS.

However, when advancing to 5G radio technology, it is foreseen that the CRS and CSI-RS will not be continuously sent by the radio access network, in order to enable the radio access network to shut down individual network nodes of the radio access network and by that to save energy. This may come along with the problem that the currently known concept of mobility measurement might not be compatible with the foreseen 5G concept.

SUMMARY

In view of the above the object of the present invention is to provide an efficient approach for mobility measurement in a radio access network.

According to a first aspect of the present invention there is provided a method of performing a mobility measurement in a wireless device operating in a radio access network.

The method of performing a mobility measurement comprises receiving a mobility measurement resource MMR assignment identifying one or more demodulation and mobility reference signals of a pre-determined set of demodulation and mobility reference signals and demodulating the mobility measurement resource MMR assignment using the one or more demodulation and mobility reference signals of the pre-determined set of demodulation and mobility reference signals.

Further, the method of performing a mobility measurement comprises determining one or more mobility measurement quality values from the identified one or more demodulation and mobility reference signals.

According to a second aspect of the present invention there is provided a method in a network node of a radio access network.

The method in the network node of the radio access network comprises generating a mobility measurement resource assignment identifying one or more demodulation and mobility reference signals of a pre-determined set of demodulation and mobility reference signals.

Further, the method in the network node of the radio access network sends the mobility measurement resource assignment to at least one wireless device operating in the radio access network and the mobility measurement resource assignment is modulated with the one or more demodulation and mobility reference signals of the pre-determined set.

According to a third aspect of the present invention there is provided a wireless device for performing mobility measurement. The wireless device is adapted to operate in a radio access network. The wireless device according to the third aspect comprises at least one interface to establish a transmission link, at least one processor, and a memory comprising instructions to be executed by the at least one processor.

According to the third aspect the wireless device is adapted to receive a mobility measurement resource assignment identifying one or more demodulation and mobility reference signals of a pre-determined set of demodulation and mobility reference signals, to demodulate the mobility measurement resource assignment using the one or more demodulation and mobility reference signals of the pre-determined set of demodulation and mobility reference signals, and to determine one or more mobility measurement quality values from the identified one or more demodulation and mobility reference signals.

According to a fourth aspect of the present invention there is provided a wireless device for performing mobility measurement. The wireless device is adapted to operate in a radio access network.

According to the fourth aspect the wireless device comprises a receiving module for receiving a mobility measurement resource assignment identifying one or more demodulation and mobility reference signals of a pre-determined set of demodulation and mobility reference signals, a demodulation module for demodulating the mobility measurement resource assignment using the one or more demodulation and mobility reference signals of the pre-determined set of demodulation and mobility reference signals, and a quality value determination module for determining one or more mobility measurement quality values from the identified one or more demodulation and mobility reference signals.

According to a fifth aspect of the present invention there is provided a network node for a radio access network. The network node comprises at least one interface to establish a transmission link, at least one processor, and a memory comprising instructions to be executed by the at least one processor.

According to the fifth aspect the network node is adapted to generate a mobility measurement resource assignment identifying one or more demodulation and mobility reference signals of a pre-determined set of demodulation and mobility reference signals, and to send the mobility measurement resource assignment to at least one wireless device operating in the radio access network. The mobility measurement resource assignment is modulated with the one or more demodulation and mobility reference signals of the pre-determined set.

According to a sixth aspect of the present invention there is provided a network node comprising a generating module for generating a mobility measurement resource assignment identifying one or more demodulation and mobility reference signals of a pre-determined set of demodulation and mobility reference signals, and a sending module for sending the mobility measurement resource assignment to at least one wireless device operating in the radio access network. The mobility measurement resource assignment is modulated with the one or more demodulation and mobility reference signals of the pre-determined set.

According to a seventh aspect of the present invention there is provided a computer program comprising program code to be executed by at least one processor of a wireless device. The execution of the program code causes the wireless device to execute the steps of a method according to the first aspect of the present invention.

According to an eighth aspect of the present invention there is provided a computer program product comprising program code to be executed by at least one processor of a wireless device. The execution of the program code causes the wireless device to perform the steps of a method according to the first aspect of the present invention.

According to a ninth aspect of the present invention there is provided a computer program comprising program code to be executed by at least one processor of a network node. The execution of the program code causes the network node to execute the steps of a method according to the second aspect of the present invention.

According to a tenth aspect of the present invention there is provided a computer program product comprising program code to be executed by at least one processor of a network node. The execution of the program code causes the network node to perform the steps of a method according to the second aspect of the present invention.

BRIEF DESCRIPTION OF DRAWINGS

In the following, preferred embodiments of the present invention will be explained with respect to the drawing in which:

FIG. 4 shows a flowchart of operation for configuration of the wireless device prior to mobility measurement according to embodiments of the present invention;

FIG. 5 shows a further detailed flow chart of operation of the wireless device shown in FIG. 3;

DETAILED DESCRIPTION

Figure 1B:
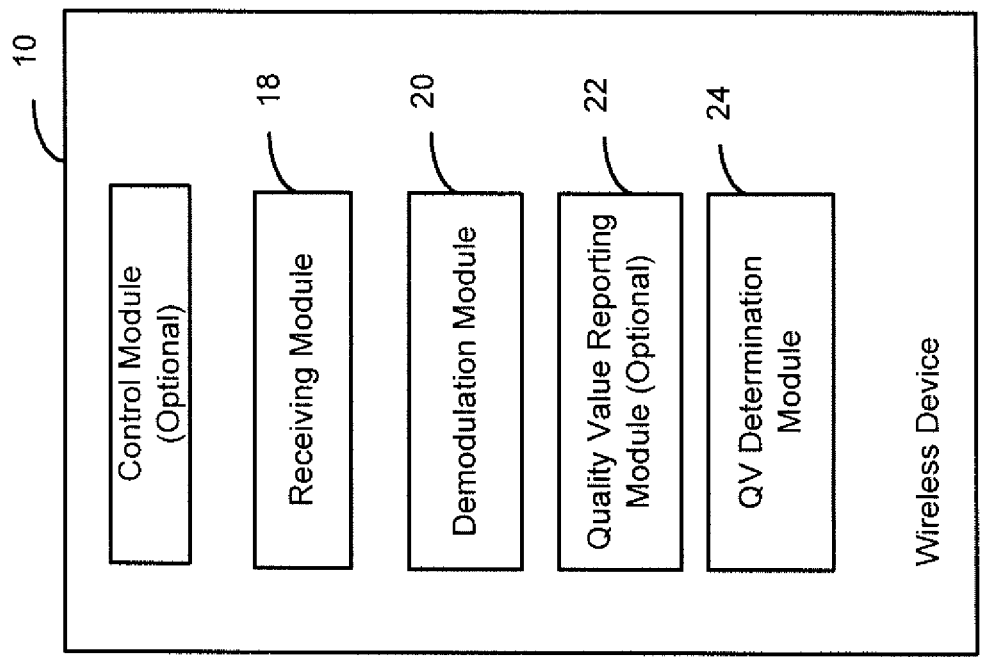
FIG. 1B shows a schematic diagram of a wireless device operating in a radio access network and performing mobility measurement according to embodiments of the present invention.

According to some embodiments of the present invention, the radio access network, e.g. a network node, may send a MMR assignment to a wireless device. To this end, the network node may have modulated the MMR assignment using demodulation reference signals before sending the MMR assignment. This MMR assignment may be demodulated by the wireless device using demodulation reference signals. The MMR assignment may indicate that all or a part of these demodulation reference signals are to be also used as mobility reference signals. Thus, these reference signals are referred throughout this application as "demodulation and mobility references signals" in order to indicate the twofold purpose of the reference signals. It is noted that the MMR assignment may also indicate further mobility reference signals to be used for mobility measurement by the wireless device, but theses mobility reference signals may not be used for demodulation of the MMR assignment.

These demodulation and mobility reference signals may be also transmitted in a (data) transmission together with the MMR assignment. In this regard, the MMR assignment may assign respectively identify the (e.g. radio) resource or resources to be used by the wireless device for the mobility measurement. It is noted that the reference signals carried in one transmission may be denoted as a pilot.

At receipt of the transmission carrying the MMR assignment and the demodulation and mobility reference symbols from the radio access network, the wireless device may demodulate the MMR assignment using the demodulation and mobility reference signals, and by that may also determine one or more mobility measurement quality values of the corresponding transmission. The one or more mobility measurement quality values may be defined with respect to the assigned mobility reference signals. The wireless device may identify which quality values may be used for the mobility measurement in that the wireless device may decode the MMR assignment and may thus "read" respectively "understand" the identification of the demodulation and mobility measurement reference signals which are identified by the MMR assignment. The quality values may correspond to a channel estimate of a channel between the wireless device and the radio access network.

Hence, the scheduled mobility measurement assignment may assign, loosely speaking, a "reuse" of some, multiple or all of the demodulation and mobility reference signals sent together with the MMR assignment for mobility measurement purposes, implying that this concept of mobility measurement may represent a self-contained solution.

The transmission carrying the demodulation and mobility measurement reference signals and the MMR assignment may be embodied as a beam, i.e. a spatially directed transmission. Therefore, the determined mobility measurement quality values may indicate the spatial direction in which the wireless device may perceive a good transmission quality over the air interface.

The MMR assignment may also indicate a mobility measurement identity usable to associate the quality values and thus the mobility measurement with the mobility measurement identity.

The wireless device may then report to a network node, e.g., typically a different network node compared to that having sent the MMR assignment, the mobility measurement quality values associated with the corresponding mobility measurement identities. This association may be explicit including the measurement report in that the measurement report may include the quality value(s) and the respective mobility measurement identity. The association may also be implicit in that the measurement report may include the quality value(s) in a certain format, e.g. in a certain sequence, so that the receiving network node may determine from the format, e.g. the location of the quality values in the sequence, which quality value(s) may be associated with which mobility measurement identity.

The network node may deduce from the mobility measurement identities which transmission, particularly which beam, may correspond to which mobility measurement quality value and optionally which network node may have sent this beam.

According to embodiments of the present invention, the association between the MMR assignment and the mobility measurement identity may be explicit in the transmission in that the MMR assignment carries the mobility measurement identity. Alternatively, the association may be implicit. To this end, the wireless device may be configured with a search space having one or more search space entries in which the MMR assignments can be received. The search space entry in which the MMR assignment is received may be associated with a mobility measurement identity.

Further, the search space may be potentially monitored by one or more wireless devices and/or data may be transmitted from one or more transmission points, e.g. network nodes of the radio access network. E.g., a scheduling assignment may be transmitted using a transmit diversity scheme with a link adaptation decision to be adopted to the intended wireless device handling the mobility signal. In some examples this may be a single wireless device receiving the scheduling assignment from a single transmission point, in some other examples it may be a large area similar to a wireless communication cell. In some embodiments, the search space can be shared between multiple transmission points and/or wireless device.

The MMR assignment may indicate a locally unique mobility measurement identity in the MMR assignment. In this context, "locally" may be meant with respect to the coverage area served by the network node or a set of network nodes and optionally with respect to a time instance at which the mobility measurement identity may be valid.

The search space may be a common search space, e.g. on a DL PCCH Downlink Physical Control Channel or a wireless device specific search space, e.g. on a DL PDCH Downlink Physical Data Channel. The search space may be configured by a received dedicated configuration message or by received system information. The mapping between the search space entries and the corresponding mobility measurement identities can change over time or can be static. Also, the search space can be contiguous in time and frequency.

Advantages of some of the above presented embodiments of the present invention may be, amongst others:

As already detailed above, the concepts according to some embodiments of the present invention can be regarded as a "self-contained" solution in that the transmission carrying the reference signals by which the wireless device is scheduled to perform mobility measurement in certain resources can be used for the mobility measurement.

Some embodiments of the present invention may enable a significantly lower overhead for "one-shot" mobility measurements compared to a state-of-the art mobility measurement procedure known from LTE in which mobility reference signals are first configured in the wireless device before these reference signals can be used by the network and the wireless device. Further, the "reuse" of demodulation reference signals as mobility reference signals may reduce the overhead, since no additional reference signals for mobility may be needed in addition to demodulation reference signals.

Some embodiments of the present invention may allow for a faster scheduling and execution of mobility measurements compared to a state-of-the art procedure known from LTE in which mobility reference signals are first configured in the wireless device before these reference signals can be used by the network and the wireless device.

Designing the transmission as a beam may enable spatially resolved mobility measurement. In particular, additional measurements using additional reference signals for spatially resolving the connection quality of the wireless device to the radio access network may be superfluous.

The (e.g. locally unique) mobility measurement identity may enable the network to easily and efficiently detect the origin of the MMR assignment such as on which transmission, e.g. the beam, mobility measurement was performed, which network node has sent the MMR assignment, which mobility measurement quality values has been reported back by the wireless device to the network etc.

In some examples in which the search space may be configured as a device specific search space, only the intended wireless device(s) may be able to decode the MMR assignment. Configuring a device configured search space may be accomplished using a device identifier such as a mobility measurement Radio Network Temporary Identifier RNTI.

In some examples, measurement diversity may be accomplished in that demodulation and mobility reference signals from two different transmission points can be received by the wireless device in parallel when one MMR assignment from one of the transmission points or a respective different MMR assignment from each of the two transmission points may be received by the wireless device. Hence, the wireless device may be reached by the network in an improved way regarding mobility measurement.

In total, a highly efficient approach for mobility measurement especially compared to the state-of-the-art mobility measurement in LTE may be accomplished.

In the following different aspects and examples of realization of the present invention will be explained.

Figure 1A:
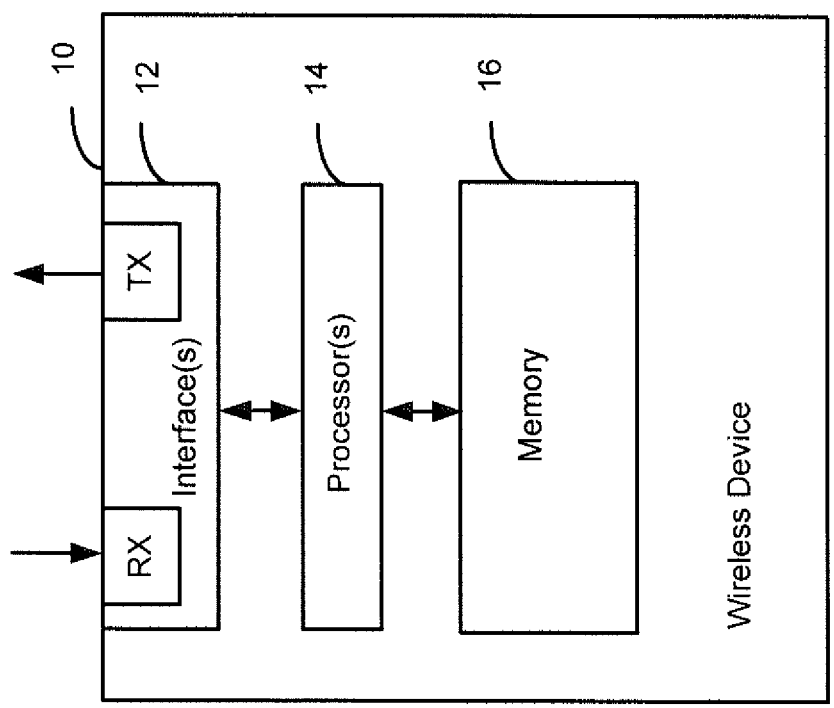
FIG. 1A shows a schematic diagram of a wireless device operating in a radio access network and performing mobility measurement according to embodiments of the present invention.

FIG. 1A, 1B show a schematic diagram of a wireless device adapted to operate in a radio access network and adapted to perform mobility measurement according to embodiments of the present invention. They illustrate exemplary structures which may be used for implementing the concepts underlying the present invention in a wireless device, e.g., a cellular phone operable in a cellular network.

As shown in FIG. 1A, the wireless device 10 may include at least one interface 12, e.g., a radio interface. The interface 12 is suitable for wireless information exchange, e.g., with a network node of the radio access network. In some scenarios, the interface 12 may also be used for exchanging information with a further wireless device, e.g. a further cellular phone operable in a cellular network. Alternatively, the wireless device 10 may comprise a further suitable interface configured for communication with the further wireless device. RX represents a receiving capability of the at least one interface 12, and TX represents a sending capability of the at least one interface 12.

As shown in FIG. 1A, the wireless device 10 comprises at least one processor 14 coupled to the interface 12 and a memory 16 coupled to the processor(s) 14. The memory 16 may include a read-only memory ROM, e.g., a flash ROM, a random access memory RAM, e.g., a dynamic RAM DRAM or a static RAM SRAM, a mass storage, e.g., a hard disc or solid state disc, or the like. The memory 16 also includes instructions, for example suitably configured program code to be executed by the processor(s) 14 in order to implement a later described functionality of the network node 10 and causing the wireless device 10 to perform a method according to the present disclosure. The program code may also relate to various control functionalities of the wireless device 10, e.g., for controlling the wireless device 10 as to establishing and/or maintaining radio links, or the like.

As shown in FIG. 1B, the wireless device 10 may comprise a receiving module 18, a demodulation module 20, a quality value determining module 22, and optionally a quality value reporting module 24. Functionalities of these modules 18-24 will be described in the following and may enable the wireless device 10 to perform a method according to the present disclosure. Optionally, the wireless device 10 may also include a control module for implementing various control functionalities, e.g., for controlling the wireless device 10 as to establishing and/or maintaining radio links, or the like.

Figure 2:
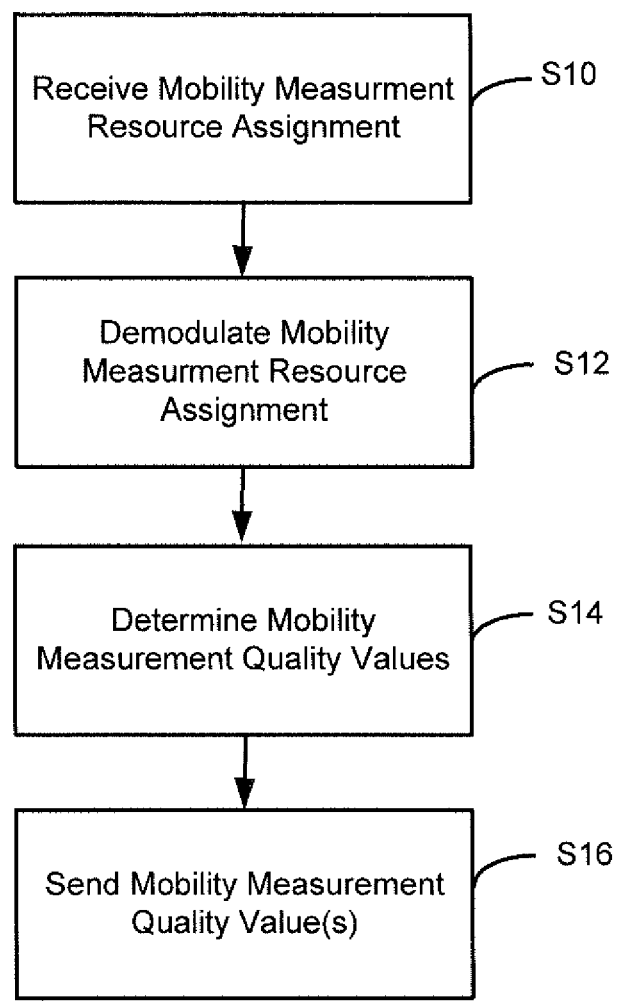
FIG. 2 shows a flowchart of operation for the wireless device shown in FIG. 1A, 1B, in particular with respect to performing a mobility measurement in the wireless device.

FIG. 2 shows a flowchart of operation for the wireless device 10 shown in FIG. 1A, 1B, in particular with respect to performing a mobility measurement in the wireless device 10.

As shown in FIG. 2, initially there is executed a step S10, operated by the memory 16 in corporation with the processor(s) 14 or by the receiving module 18, respectively, to receive a mobility measurement resource assignment identifying one or more demodulation and mobility reference signals of a pre-determined set of demodulation and mobility reference signals.

As shown in FIG. 2, then follows a step S12, operated by the memory 16 in corporation with the processor(s) 14 or by the demodulation module 20, respectively, to demodulate the mobility measurement resource assignment using the one or more demodulation and mobility reference signals of the pre-determined set of demodulation and mobility reference signals RS.

According to embodiments of the present invention demodulation and mobility reference signals are defined, e.g., as demodulation and mobility reference signals RS No. 1-8, and a set respectively partition of these demodulation and mobility reference signals RS is used for mobility measurement, e.g., demodulation and mobility reference signals RS No. 1, 2, 3. The wireless device 10 demodulates the mobility measurement resource assignment for all demodulation and mobility reference signals RSs No. 1-8. After an optional decoding step, then the wireless device 10 is able to read the mobility measurement resource assignment including the information identifying the one or more demodulation and mobility reference signals RSs of the set, e.g., the demodulation and mobility reference signals No. 1 and 2 or e.g. the demodulation and mobility reference signals No. 1, 2, 3.

That is to say, the demodulation and mobility reference signals RS may be partitioned into sets and one or more sets is/are used for mobility measurement. Further, the references signals used for mobility measurement can be identical to the references signals used for demodulation or can be a subgroup of the reference signals used for demodulation.

As shown in FIG. 2, then follows a step S14, operated by the memory 16 in corporation with the processor(s) 14 or by the quality value determination module 22 respectively, to determine one or more mobility measurement quality values from the identified one or more demodulation and mobility reference signals.

According to embodiments of the present invention, per demodulation and mobility reference signal RS one or more quality values can be obtained; if more values are obtained per demodulation and mobility reference signal RS, then filtering can be applied, leading to one quality value.

Hence, the wireless device 10 may determine the quality values obtained from the demodulation of the assignment using the identified one or more demodulation and mobility reference signals RSs of the set defined in the MMR assignment, e.g., demodulation and mobility reference signals RSs No. 1, 2.

As shown in FIG. 2, then follows an optional step S16, operated by the memory 16 in corporation with processor(s) 14 or by the quality value reporting module 24, respectively, to report one or more mobility measurement quality values to a network node of the radio access network.

In the following, further aspects and steps of receiving mobility measurement configuration information and a mobility measurement resource assignment at the wireless device 10 will be explained. In this regard, FIG. 3 shows a further detailed flowchart of operation for the wireless device 10 shown in FIG. 1A, 1B.

Figure 3:
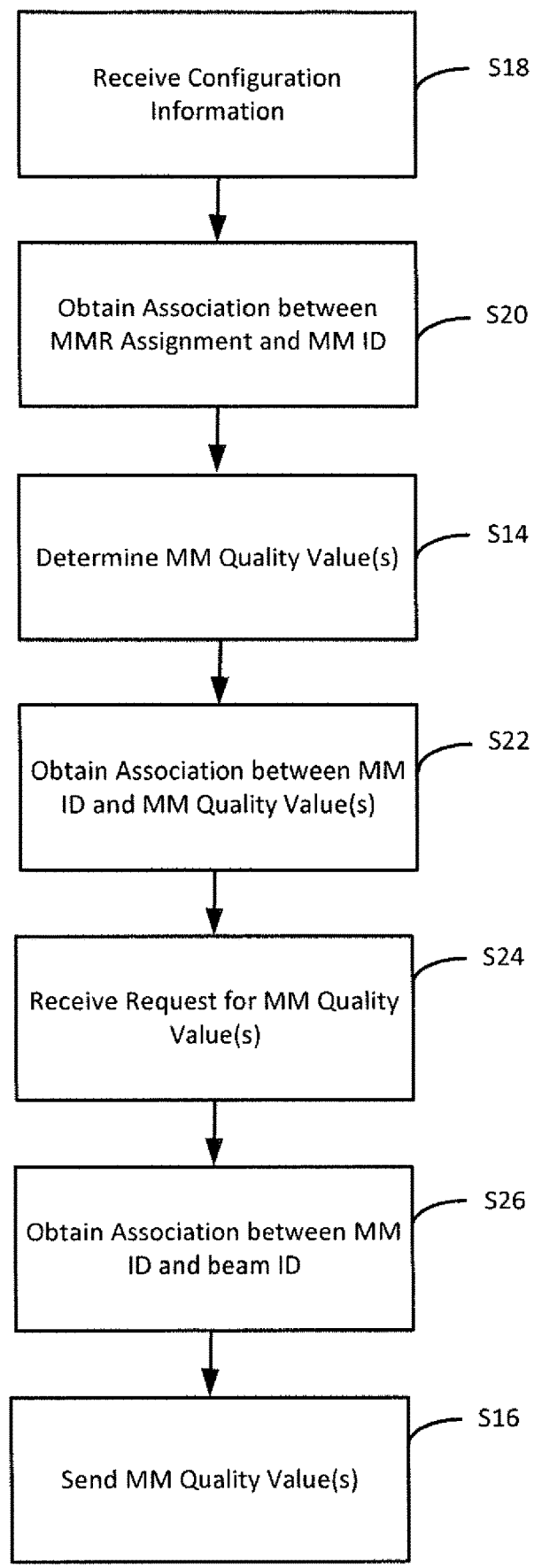
FIG. 3 shows a further detailed flowchart of operation for the wireless device shown in FIG. 1A, 1B.

As shown in FIG. 3, the mobility measurement method comprises a step S18, operated by the memory 16 in corporation with the processor(s) 14 or by the receiving module 18, respectively, to receive configuration information prior to receiving the mobility measurement resource assignment, the configuration information specifying the search space in such a way that the location of the subspace in the search space is associated with the mobility measurement identity. Here it should be noted that in some embodiments such configuration information may be received from a network node in the radio access network which is different from the network node sending the MMR assignment.

Again referring to FIG. 3, in the following further details of receipt of the mobility measurement resource assignment of step S10 will be explained. According to embodiments of the present invention the mobility measurement resource assignment and the pre-determined set of demodulation and mobility reference signal RSs may be received together in a beam. Further, the mobility measurement resource assignment may schedule the wireless device 10 to determine the one or more mobility measurement quality values and the mobility measurement resource assignment may indicate a mobility measurement identity.

As shown in FIG. 3, the mobility measurement method comprises a step S20, operated by the memory 16 in corporation with the processor(s) 14 or by the MMR receiving module 18, respectively, to obtain an association between the mobility measurement resource assignment and the indicated mobility measurement identity to associate the mobility measurement identity with the one or more mobility measurement quality values. E.g., according to embodiments of the present invention two MMR assignments can be associated with the same mobility measurement identity; then, the wireless device 10 may report two quality values, i.e. one per each received MMR assignment, or one quality value, e.g., an average, minimum, or maximum of the two values.

In some embodiments, the mobility measurement resource assignment includes the mobility measurement identity and in step S20 the association is obtained by extracting the mobility measurement identity from the mobility measurement resource assignment.

According to embodiments of the present invention transmission between the radio access network and the wireless device 10 may use radio resources defined in a time domain and in a frequency domain, wherein the wireless device is configured with a search space for receipt of the mobility measurement resource assignment. In some embodiments, the set of entries of search space may be contiguous in time and frequency, but the complete search space might not be contiguous in time and frequency.

Further, the search space may be configured by signaled, dedicated control information or by signaled system information. Generally, the search space may correspond to a subset of the radio resources, wherein the search space is configured as one of the group consisting of a search space for receipt of (only) control data on a downlink control channel, a search space for receipt of control data and payload data on a downlink data channel, and a search space for receipt of mobility measurement resource assignments, the search space being different from a search space for receipt of control data assigning one or more radio resources for transmission and/or receipt of payload data.

It should be noted that for each of the three options outlined above for each of the enumerations it can be a common search space or a wireless device configured search space. Here, "wireless device configured search space" may mean that one wireless device or more wireless devices, e.g. located in a cell, can read the search space. In the latter case, such a search space may hence be a shared search space, which may be shared by two or more wireless devices. The technical background of this is that a search space is defined by search space entries, e.g. search space candidates in LTE, which map to physical radio resources (e.g. radio resource elements in LTE). The definition of the search space entries may depend on certain parameters. In case of a wireless device configured search space, one parameter may be the RNTI assigned to one or more wireless devices; a common search space may be independent of a RNTI. In one option, the RNTI might be a dedicated RNTI used (only) for mobility measurement; this RNTI can be assigned to only one wireless device 10 so that only this wireless device 10 can read the search space or this RNTI can be assigned to more wireless devices 10 which can jointly read the search space. In another option, the RNTI may be a RNTI used for mobility measurement and payload transmission. In either option, the MMR assignment may be embodied as one or more bits in a message indicating to the wireless device the resource(s), hence which demodulation and mobility reference signals, to be used for mobility measurement. In such a case when the RNTI may be unique per wireless device, one MMR assignment may need to be sent per one wireless device for scheduling mobility measurement. However, using one RNTI for more wireless device may enable that one MMR assignment may be used for scheduling mobility measurement for more wireless devices in parallel.

According to a variation to the above explanations, in step S20 the association between the mobility resource assignment and the mobility measurement identity is obtained by extracting the mobility measurement identity based on a location of a subspace in the search space in which subspace the MMR assignment is received.

Further, in some embodiments, the MMR assignment may include a parameter value specifying partly the mobility measurement identity, wherein the association between the mobility resource assignment and the mobility measurement identity is obtained by extracting the mobility measurement identity from a location of a subspace of the search space and the parameter value. For example, at receipt of the MMR assignment in the subspace of the search space, the wireless device may deduce from the location of the subspace in the search space and the parameter in the MMR assignment which mobility measurement identify was indicated in the MMR assignment, and may associate the received MMR assignment with the deduced mobility measurement identity.

As shown in FIG. 3, the mobility measurement method comprises a step S22, operated by the memory 16 in corporation with the processor(s) 14 or by the quality value determination module 22, respectively, to obtain an association between the indicated mobility measurement identity and the one or more mobility measurement quality values.

The step S16 for quality value reporting may be executed to send a mobility measurement report to the radio access network which report indicates the determined one or more mobility measurement quality values in combination with the mobility measurement identity. Generally, according to embodiments of the present invention one value per mobility measurement identity is reported and the wireless device 10 can determine more quality values and derives the quality value to be reported from the more quality values, e.g., by averaging more values over time to obtain one value.

The step S16 of reporting the quality value(s) may be triggered by a trigger event. In a first option, the trigger event may correspond to at the wireless device 10 receiving a message such as the MMR assignment, the mobility measurement report request or a Media Access Control MAC control element. In a second option, the trigger event may correspond to at the wireless device 10 determining in the step S14 that one or more quality values have changed compared to a previous determination thereof. In the first option, the message may include a request that the reporting is to be performed by the wireless device 10 periodically or aperiodically. In the second option, the trigger event may correspond to that e.g. a determined quality value for a first mobility measurement identity may be determined to become higher compared to a determined quality value for a second mobility measurement identity. An example of the first option is that the MMR assignment comprises a parameter indication that quality values shall be reported. The wireless device 10 may be configured to report a subset of values it has obtained, but not only the ones obtained due to the MMR assignment, or the wireless device 10 may be configured to only report a subset of the values obtained due to the MMR assignment. The subset of values may in some embodiments be determined by the wireless device 10 comparing the quality value(s) with a fixed threshold or relative with respect to a previous reported value. In the comparison, an offset value may be used, wherein the quality value(s) e.g. shall correspond to a value which is by (at least) the offset value larger than the threshold.

In the trigger event, i.e. the receipt of message or the above explained other trigger event, it may be identified for which one or more mobility measurement identities the quality value(s) should be reported. The mobility measurement report may include the one or more mobility measurement identities or may indicate the one or more mobility measurement identities implicitly, e.g. by a certain format of the transmitted quality value(s). E.g. the quality values may be formatted in such a way that the quality value associated with the lowest mobility measurement identity is placed in the message firstly, followed by the quality value for next lowest mobility measurement value, and so on.

As shown in FIG. 3, prior to report of quality values there may be executed an optional step S24, operated by memory 16 in corporation with the processor(s) 14, or by the receiving module 18, to receive a mobility measurement report request from the radio access network, wherein the mobility measurement report is sent in response to the mobility measurement report request.

According to embodiments of the present invention, the MMR assignment and request can be sent together in one message or can be sent separately in different messages. Further, reporting may occur to a network node in the radio access network which has sent the MMR assignment or to a different network node.

A further variation of the present invention relates to a case where in step S18 configuration information is received prior to receipt of the mobility measurement resource assignment and wherein the configuration information specifies an association between a mobility measurement identity and a beam identity. Then the mobility measurement report request may include a beam identity.

As shown in FIG. 3, the mobility measurement method comprises a step S26, operated by the memory 16 in corporation with the processor(s) 14, or by the reporting module 24, respectively, to relate the received beam identity with the associated mobility measurement identity using the association between the mobility measurement identity and the beam identity to obtain a related mobility measurement identity, and to send the mobility measurement report so as to include the one or more mobility measurement quality values associated with the related mobility measurement identity in the sent mobility measurement report.

As an example the assignment may comprise a 2-bit field for mobility measurement identity. Assuming that a network node in the radio network wants to obtain mobility measurements performed for 8 beams it first configures a wireless device with an association:

| MMI | BI |
|-----|-----|
| 0 | 0 |
| 1 | 1 |
| 2 | 2 |
| 3 | 3 |

MMI=Mobility measurement identity
BI Beam identity (interpretable by the network node)

Then network node sends mobility measurement resource assignments with MMI=0, 1, 2, 3, using one or more mobility measurement resource assignments. The network node can then request one or more mobility measurement reports to receive quality values for beam identities 0, 1, 2 and 3.

It is noted that other mappings between the MMI and the BI are possible in which the value of the MMI and the MI are different from one another, as explained below.

Then the network node reconfigures the wireless device with the association:

| MMI | BI |
|-----|-----|
| 0 | 4 |
| 1 | 5 |
| 2 | 6 |
| 3 | 7 |

Then network node sends MMR assignment(s) with MMI=0, 1, 2, 3 (e.g. using one or more MMR assignments) and request one or more mobility measurement reports to obtain the quality values for the beam identities 4, 5, 6 and 7.

Figure 4:
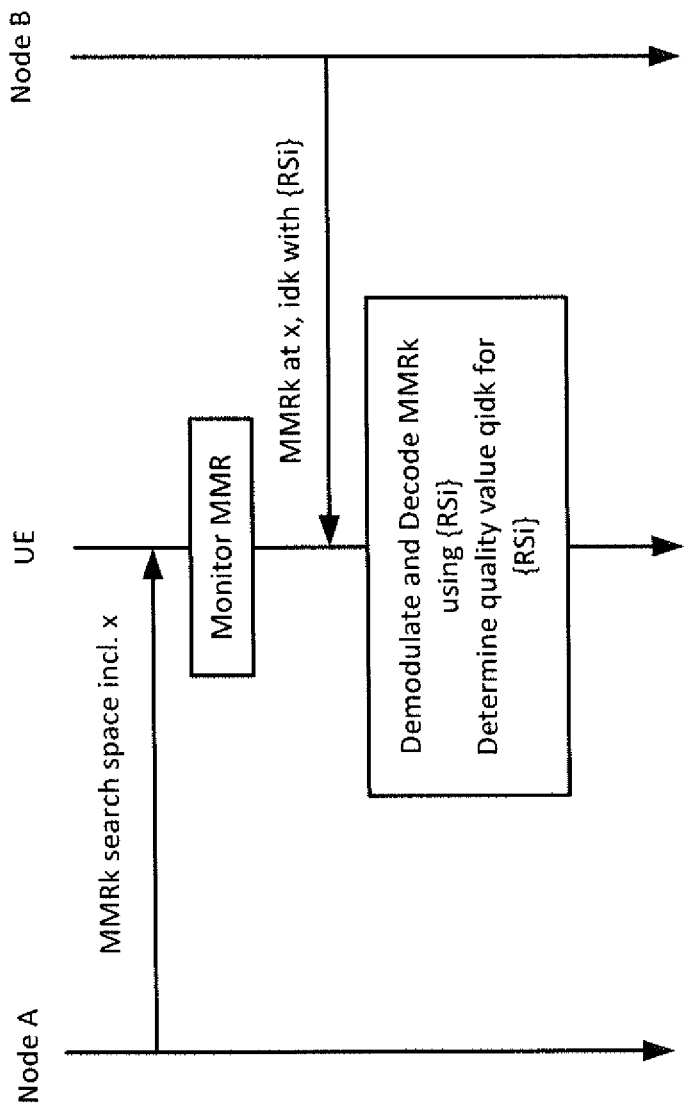
FIG. 4 shows another detailed flowchart of operation for the wireless device shown in FIG. 1A, 1B reflecting configuration and measurement at the wireless device.

FIG. 4 shows another detailed flowchart of operation for the wireless device 10 shown in FIG. 1A, 1B reflecting configuration and measurement at the wireless device 10.

As shown in FIG. 4 and outlined above, the wireless device, now referenced by "UE" receives configuration specifying a MMR assignment search space from a network node A. The wireless device UE monitors the search space looking for MMR assignments.

As shown in FIG. 4, the wireless device UE then receives a MMR assignment $MMR_k$ transmitted from another network node B. The MMR assignment is transmitted in a "location" x within the MMR assignment search space. The wireless device UE decodes the MMR assignment using a set of demodulation and mobility reference signals $\{RS_i\}$ and the same demodulation and mobility reference signals $\{RS_i\}$ are used to generate a mobility measurement quality value $q_{id,k}$.

For the embodiment shown in FIG. 4 the wireless device UE has a mobility measurement resource MMR search space, wherein the wireless device UE may receive a MMR assignment. The MMR assignment is a message assigning the MMR to the wireless device UE and the message is received in one of the possible search space entries defined in the MMR search space. The MMR assignment is demodulated by the wireless device UE using a set of demodulation and mobility reference signals RS, which herein are comprised in resources of the MMR search space. After decoding the MMR assignment, if the wireless device UE finds a MMR assignment it obtains one or more mobility measurement identities identifying subsets of said demodulation and mobility reference signals RS. The wireless device UE then determines mobility measurement quality values based on the obtained mobility measurement identities. Here, mobility measurement quality values may be determined by the wireless device UE from the demodulation of the MMR assignment e.g. by means of estimation.

According to embodiments of the present invention the location x of the subspace in the search space may indicate a mobility measurement identity $id_k$, while the mobility measurement identity in other embodiments is comprised in the MMR assignment. The determined quality value or values are associated with the mobility measurement identity.

Figure 5:
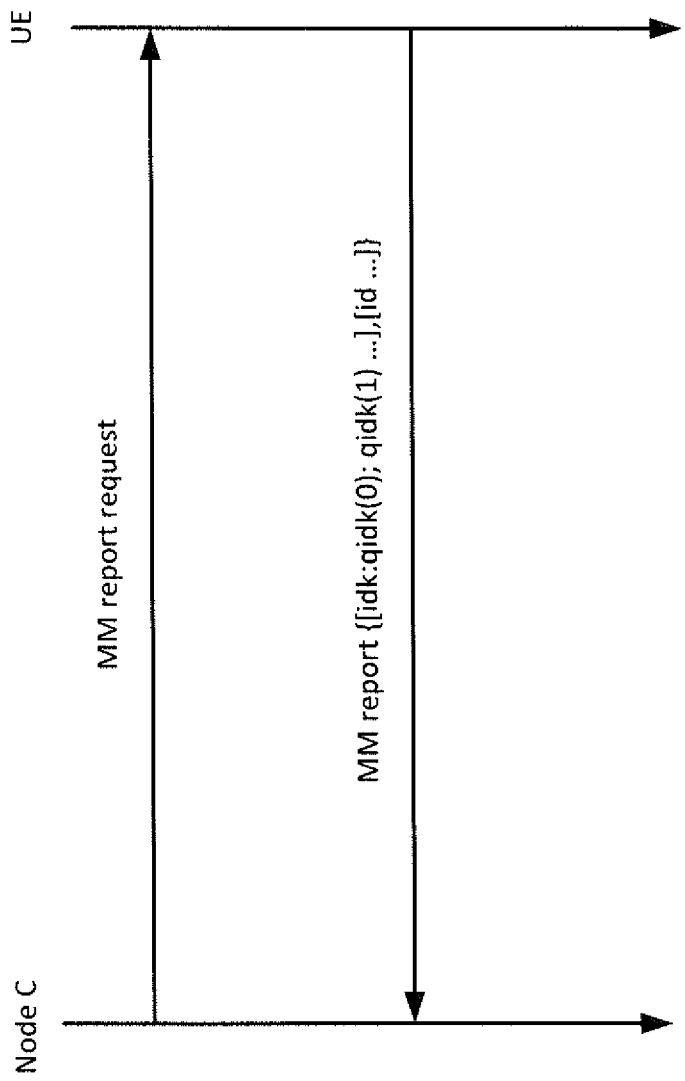
FIG. 5 shows yet another detailed flowchart of operation for the wireless device shown in FIG. 1A, 1B reflecting reporting from the wireless device.

FIG. 5 shows yet another detailed flowchart of operation for the wireless device shown in FIG. 1A, 1B reflecting reporting from the wireless device.

As shown in FIG. 5, the wireless device, also references now by "UE" may be requested for sending a MM report. In some embodiments, the wireless device UE may be configured to transmit a MM report without receiving a MM report request. Generally, the report comprises at least one identification $id_k$ in the sense outlined above, and further at least one quality value $q_{idk}(0)$, $q_{idk}(1)$ . . . .

As shown in FIG. 5, the network node C requesting the report may by different from a network node A configuring the mobility measurement at the wireless device UE or a network node B submitting a request for mobility measurement.

In the following specific scenarios regarding the receipt of multiple mobile measurement assignments from either a single network node in the radio access network or from multiple network nodes in the radio access network will be explained.

Figure 6:
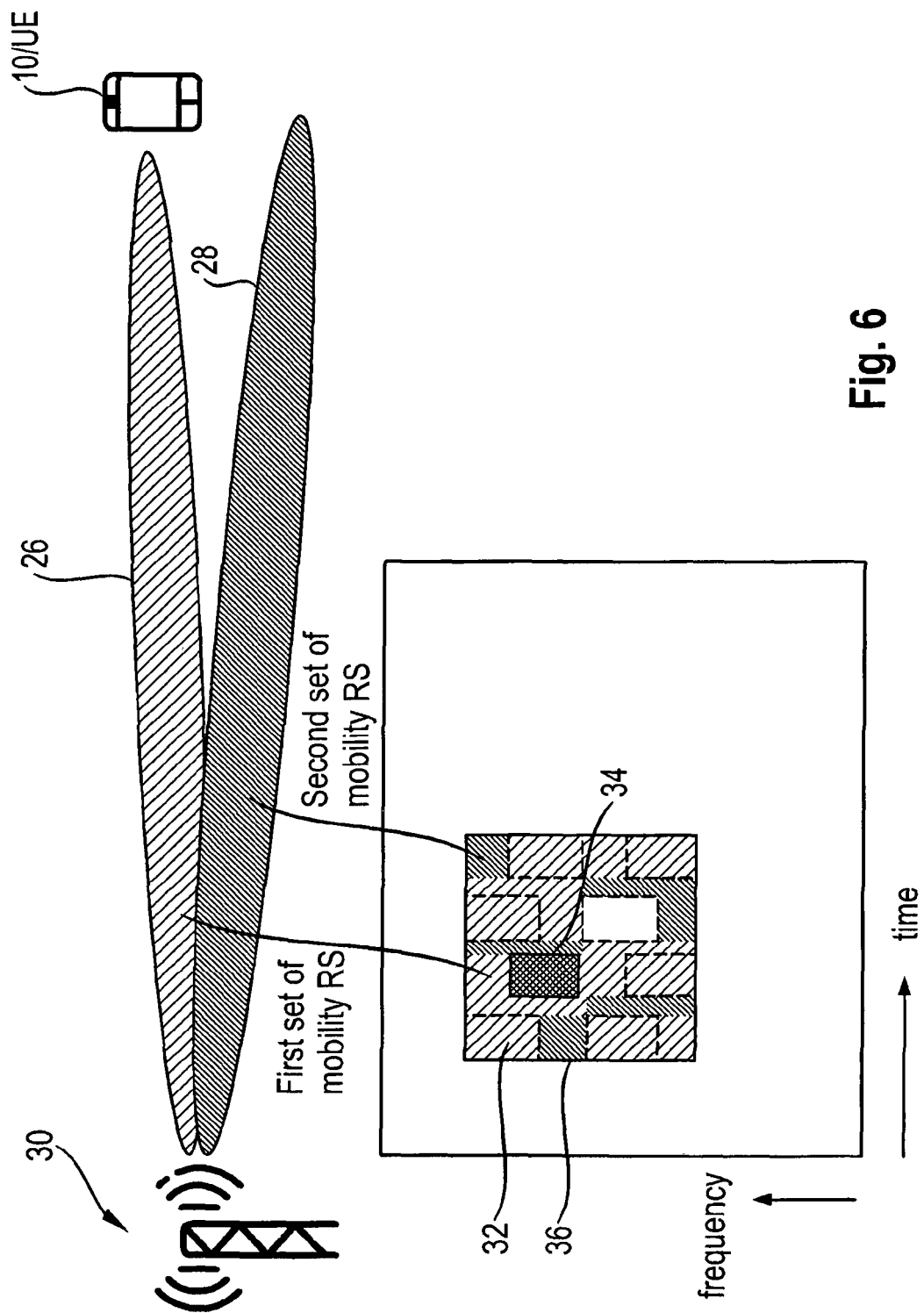
FIG. 6 shows an application scenario in which the wireless device performs mobility measurement on two beams transmitted in the radio access network.

FIG. 6 shows an application scenario in which a wireless device 10, UE performs mobility measurement on two beams 26, 28 transmitted in the radio access network 30. The wireless device may be the wireless device 10 or the wireless device UE.

As shown in FIG. 6, the received MMR assignment may be demodulated using a first and second set of beam-formed mobility reference signals. The assignment schedules a first and second mobility measurement on first and second set of mobility reference signals, respectively.

As shown in FIG. 6, the mobility measurement identities may in some embodiments be obtained from the received MMR assignment message, while in other embodiments be obtained based on which search space entry 32, 34 the MMR assignment was received.

Further, in some embodiments the MMR assignment is received on a common search space, e.g. on a PCCH Physical Control Channel while in some other embodiments the MMR search space 36 is UE- or UE-group-specific on a PDCH Physical Data Channel.

As shown in FIG. 6, the first set of beam-formed mobility reference signals and the second set of beam-formed mobility reference signals may be received in some embodiments within the search space 36, e.g. outside of the search space entries 32, 34.

Figure 7:
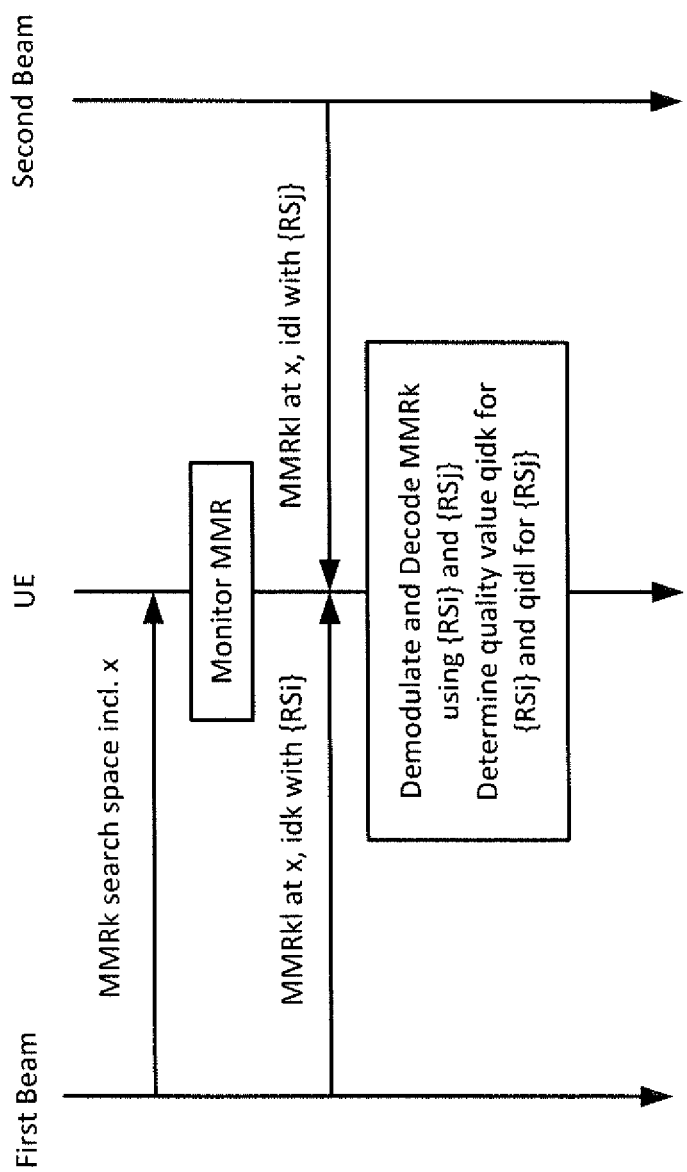
FIG. 7 shows demodulation of a MMR assignment for the application scenario in which the wireless device performs mobility measurement on two beams.

FIG. 7 shows demodulation of MMR assignment for the application scenario in which the wireless device performs mobility measurement on two beams, in particular a multi-beam mobility measurement procedure using a single MMR assignment. The wireless device may be the wireless device 10 or the wireless device UE.

As shown in FIG. 7, demodulation of the MMR assignment may use uses two sets of reference signals wherein first and second sets are transmitted using a first and a second beam, respectively. The MMR assignment is, in some embodiments, transmitted using both beams for diversity reasons.

As shown in FIG. 7, both the first and second beams transmit a MMR assignment $MMR_{kl}$ wherein k and l are mobility measurement identities determined by that the MMR assignment is detected in search space identity x. At demodulation of the MMR assignment the wireless device UE uses two sets of demodulation and mobility reference signals in which the first set $\{RS_i\}$ is transmitted using the first beam while the second set $\{RS_j\}$ is transmitted using the second beam. Note that before decoding of the MMR assignment the wireless device UE may in some embodiments not know that it is actually decoding a MMR assignment. After decoding the wireless device UE knows that it has received an MMR assignment and therefore generates quality values $q_{idk}$ and $q_{idl}$ for $\{RS_j\}$ and $\{RS_j\}$, respectively, e.g. by means of estimation.

As outlined above the mobility measurement identities may in some embodiments be comprised in the MMR assignment. In such embodiments the mobility measurement identities may consist of a list of indicators (e.g., integers) or be a single indicator that indicates an index to a table entry identifying the mobility measurement identities or a partition of the demodulation reference signal resources to mobility measurement resources or a partition of the demodulation and mobility reference signals to a set or sets of mobility reference signals. E.g. the MMR assignment may carry an indicator which can be interpreted by the wireless device by looking up a table listing, as table entries, indicators mapping to a respective partition of the demodulation reference signal resources to be used for mobility measurement or mapping to a respective partition of demodulation reference signals to be used as the mobility reference signals. For example, in a case in which the wireless device UE is preconfigured with a table mapping indicators to mobility measurement identities, the MMR assignment may comprise an indicator mapping to a subset of the mobility measurement identities to be used at this certain time and location instead of the complete set of mobility measurement identities.

Figure 8:
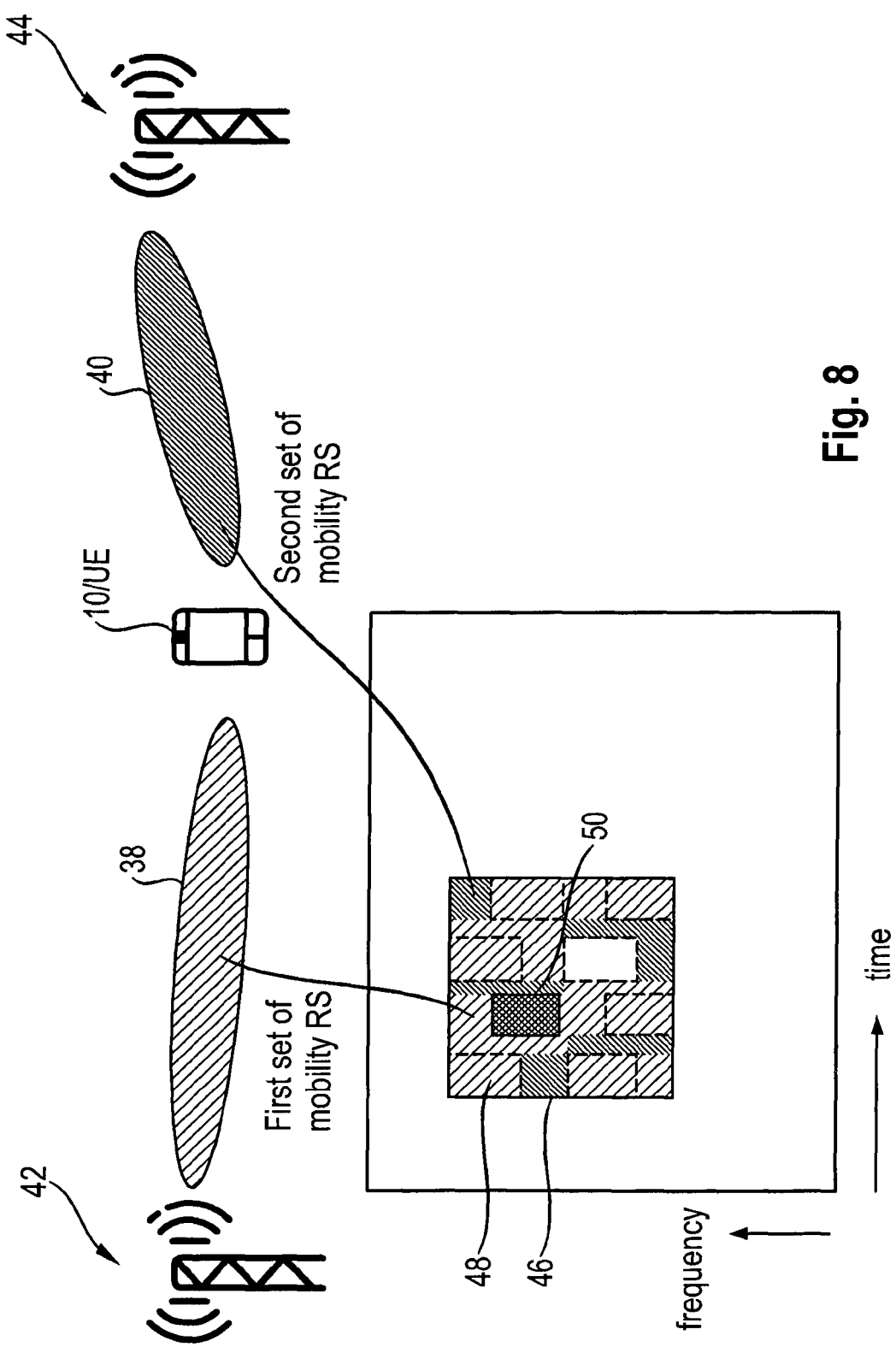
FIG. 8 shows another application scenario in which the wireless device performs mobility measurement on two beams transmitted in the radio access network.

FIG. 8 shows another application scenario in which the wireless device performs mobility measurement on two beams 38, 40 transmitted in the radio access network. The wireless device may be the wireless device 10 or the wireless device UE. Here, a received MMR assignment is demodulated using a first set and a second set of beam-formed mobility reference signals transmitted from two transmission points, e.g., two network nodes 42, 44. The MMR assignment identifies respectively assigns a first and a second mobility measurement on first and second sets of mobility reference signals, respectively.

As shown in FIG. 8, in general, the search space 46 where the MMR assignment can be transmitted may be utilized by multiple transmission points to reach one or more wireless devices 10, UE with MMR assignments. The transmission format for the MMR assignment may have high diversity and good link-budget so that the network nodes 42, 44 can reach UE further out to a larger coverage area. The MMR assignments may be sent by a single transmission point or jointly by two or more transmission points. To enable the UE to differentiate between different mobility measurements 48, 50 the MMR assignment may comprise a mobility measurement identity.

As shown in FIG. 8, the first set of beam-formed mobility reference signals and the second set of beam-formed mobility reference signals may be received in some embodiments within the search space 46, e.g. outside of the search space entries 48, 50.

Further, from the point of view of the network node, e.g., base stations or more generally transmission points, each set of network nodes 42, 44 that support intra-set-mobility will transmit MMR assignments in a shared search space 46. From the point of view of the wireless device it does not typically know any mapping from mobility measurement identities to network nodes, rather it is transparent for the wireless device 10, UE.

While FIG. 8 does not show how the MMR assignment is transmitted, in some embodiments the assignment may be transmitted by both transmission points 42, 44 (i.e, a joint transmission is used) while in other embodiments only one of the transmission points transmits the MMR assignment. In further other embodiments each of the transmission points is sending a MMR assignment (i.e, a first assignment and a second assignment) wherein both assignments are demodulated using first and second mobility RS. In such embodiments each of the first and second MMR assignment identifies the first and second demodulation and mobility reference signals RS, respectively. It is noted that it may be transparent to the wireless device 10, UE which transmission point may have sent the MMR assignment.

While above, with respect to FIGS. 6 to 8 an outline for multi-beam mobile measurement scenarios has been given in the following, further details of multi-beam mobility measurement according to embodiments of the present invention will be explained with respect to FIG. 9. The wireless device can correspond to the wireless device 10 or the wireless device UE.

Generally, for multi-beam mobile measurement the mobility measurement resource assignment identifies one or more further demodulation and mobility reference signals of a further pre-determined set of demodulation and mobility reference signals.

Figure 9:
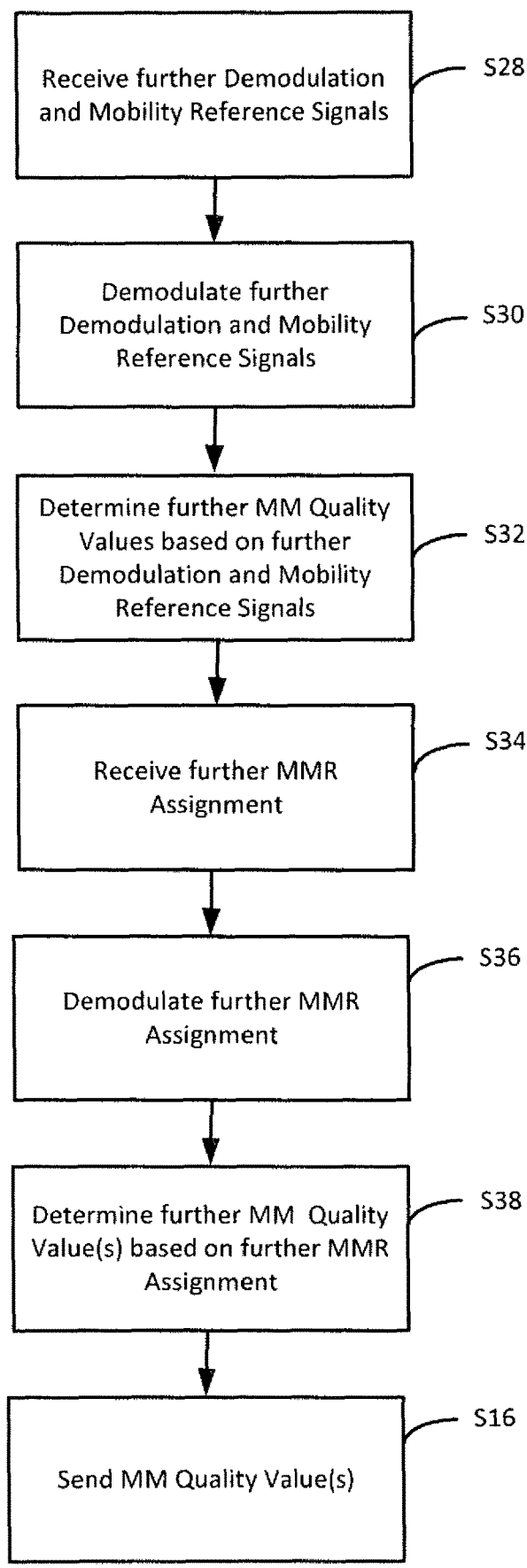
FIG. 9 shows a flow chart of operation for the wireless device shown in FIG. 1A, 1B, in particular with respect to multi-beam mobility measurement.

As shown in FIG. 9, the mobility measurement method comprises a step S28, operated by the memory 16 in corporation with the processor(s) 14 or by the receiving module 18, respectively, to receive one or more further demodulation and mobility reference signals of a further pre-determined set of demodulation and mobility reference signal.

As shown in FIG. 9, the mobility measurement method comprises a step S30, operated by the memory 16 in corporation with the processor(s) 14 or by the demodulation module 20, respectively, to demodulate the mobility measurement resource assignment using the one or more further demodulation and mobility reference signals of the further pre-determined set of demodulation and mobility reference signals.

As shown in FIG. 9, the mobility measurement method comprises a step S32, operated by the memory 16 in corporation with the processor(s) 14 or by the quality value determination module 22, respectively, to determine one or more further mobility measurement quality values from the identified one or more further demodulation and mobility reference signals of the further pre-determined set of demodulation and mobility reference signals.

Generally, in some embodiments, the mobility measurement resource assignment and the one or more demodulation reference signals of the pre-determined set are received from a first network node, and wherein the one or more further demodulation and mobility reference signals of the further pre-determined set are received from the first network node or from a second, different network node.

As shown in FIG. 6 and FIG. 8, the two beams 26, 28, 38, 40 can be both received from the network node 30, see FIG. 6, or they can be received from the network node 42 and a different network node 44, i.e. node 42, 44 co-operate, see FIG. 8.

In more detail, the further demodulation and mobility reference signals RSs are sent in a further beam which is from the same network node or from another network node. The mobility measurement identity can on the network side identify the beam and/or a network node. This knowledge about the association of the MM identity and the beam/the network node is transparent to the wireless device. It is also transparent to the wireless device from which network node the beam is received. If the further beam is from another network node different than that sending the MMR assignment, a coordination in the network node is required:

a) In some embodiments, one controlling entity for both network nodes which sets the mobility measurement identities per network node and informs the two network nodes.
  b) In some embodiments, communication between both network nodes regarding the MM identities and related configuration for both network nodes takes place.

As shown in FIG. 9, regarding the multi-beam mobility measurement, the method further comprises a step S34, operated by the memory 16 in corporation with the processor(s) 14 or by the receiving module 18, respectively, to receive a further mobility measurement resource assignment identifying one or more further demodulation and mobility reference signals of a further pre-determined set of demodulation and mobility reference signals. Here, network bode 42 sends a MMR assignment with beam 48 and a set of reference signals RS1 and network node 44 sends a MMR assignment with beam 40, and a set of reference signals RS2. Such a scenario can correspond to a so-called non-cooperating case.

As shown in FIG. 9, the method further comprises a step S36, operated by the memory 16 in corporation with the processor(s) 14 or by the demodulation module 20, to demodulate the further mobility measurement resource assignment using the one or more further demodulation and mobility reference signals of the further pre-determined set of demodulation and mobility reference signals (RS).

As shown in FIG. 9, the method further comprises a step S38, operated by the memory 16 in corporation with the processor(s) 14 or by the quality value determination module 22, respectively, to determine one or more further mobility measurement quality values from the identified one or more further demodulation and mobility reference signals of the further pre-determined set of demodulation and mobility reference signals.

In some embodiments, the wireless device is pre-configured to use the one or more demodulation and mobility reference signals for the demodulation of the mobility resource assignment.

Further, in some embodiments, there is issued a report request for a MMI group such that all quality values for mobility measurement identities of the group are reported. For this case mobility measurement identities are grouped into a mobility measurement group, the wireless device supports a mobility measurement group, and the association of a received mobility measurement resource assignment with the mobility measurement group is implicit by means of receiving the mobility measurement resource assignment in a subspace of the search space.

Figure 10B:
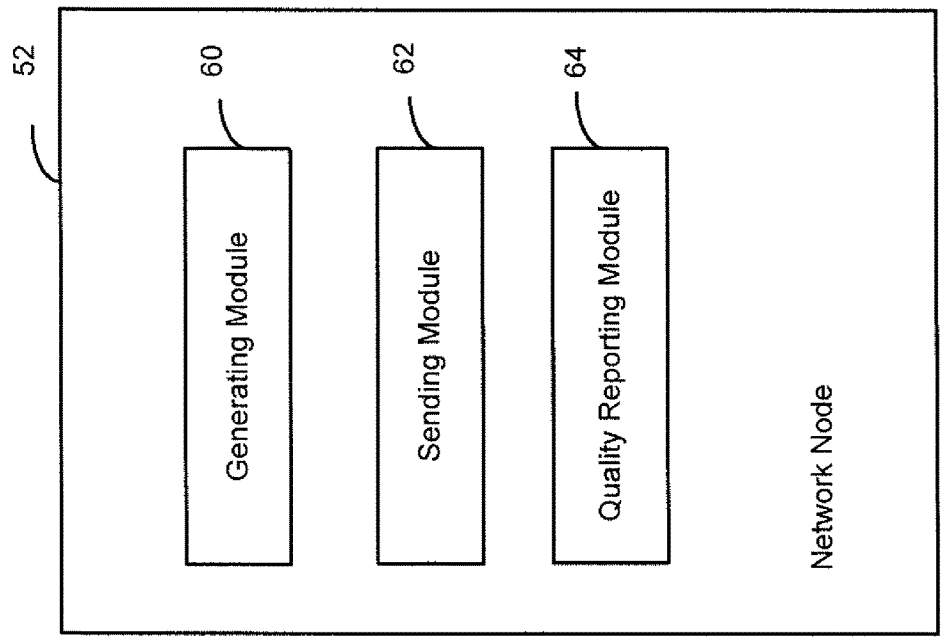
FIG. 10B shows a schematic diagram of a network node adapted for operating in a radio access network according to embodiments of the present invention.
Figure 10A:
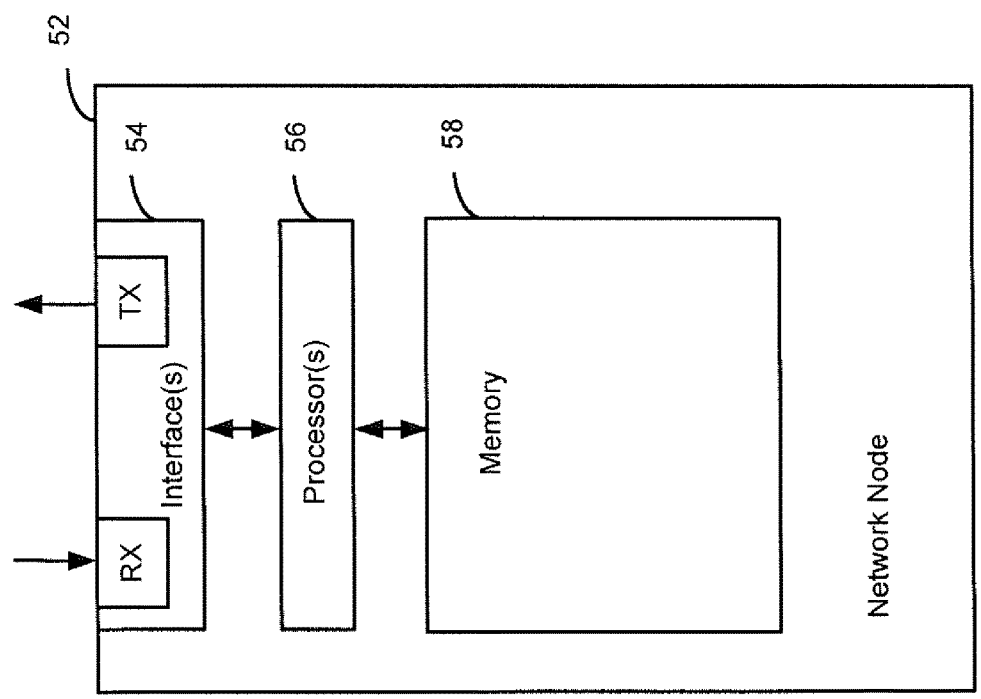
FIG. 10A shows a schematic diagram of a network node adapted for operating in a radio access network according to embodiments of the present invention.

FIG. 10A, 10B shows a schematic diagram of a network node adapted to operate in a radio access network according to embodiments of the present invention. It illustrates exemplary structures which may be used for implementing the concepts underlying the present invention in the network node, e.g., a base station of a cellular network realized as dedicated network node or as a virtual network node operating in parallel across different sub-nodes of a radio access network. The network node of FIG. 10A, 10B may correspond to one of the above described network nodes 30, 42, 44.

As shown in FIG. 1A, the network node 52 may include at least one interface 54, e.g., a radio interface. The interface 54 is suitable for wireless information exchange, e.g., with a wireless device such as a cellular phone. This wireless device may correspond to the wireless device 10, UE described above. In some scenarios, the interface 54 may also be used for exchanging information with a further network node, e.g., the network nodes 30, 42, 44. Alternatively, the network node 52 may comprise a further suitable interface configured for communication with the further network node. RX represents a receiving capability of the at least one interface 54, and TX represents a sending capability of the at least one interface 54.

As shown in FIG. 10A, the network node 52 comprises at least one processor 56 coupled to the interface 54 and a memory 58 coupled to the processor(s) 56. The memory 58 may include a read-only memory ROM, e.g., a flash ROM, a random access memory RAM, e.g., a dynamic RAM DRAM or a static RAM SRAM, a mass storage, e.g., a hard disc or solid state disc, or the like. The memory 58 also includes instructions, for example suitably configured program code to be executed by the processor(s) 56 in order to implement a later described functionality of the network node 52 can cause the network node 52 to perform a method according to the present disclosure. The program code may also relate to various control functionalities, e.g., for controlling the network node 52 as to establishing and/or maintaining radio links, or the like.

As shown in FIG. 10B, the network node 52 may include a generating module 60, a sending module 62, and a quality reporting module 64. Functionalities of these modules 60-64 will be described in the following and may enable the wireless device 10 to perform a method according to the present disclosure. Optionally, the network node 52 may also implement a control module for implementing various control functionalities, e.g., for controlling the network node 52 as to establishing and/or maintaining radio links, or the like.

Figure 11:
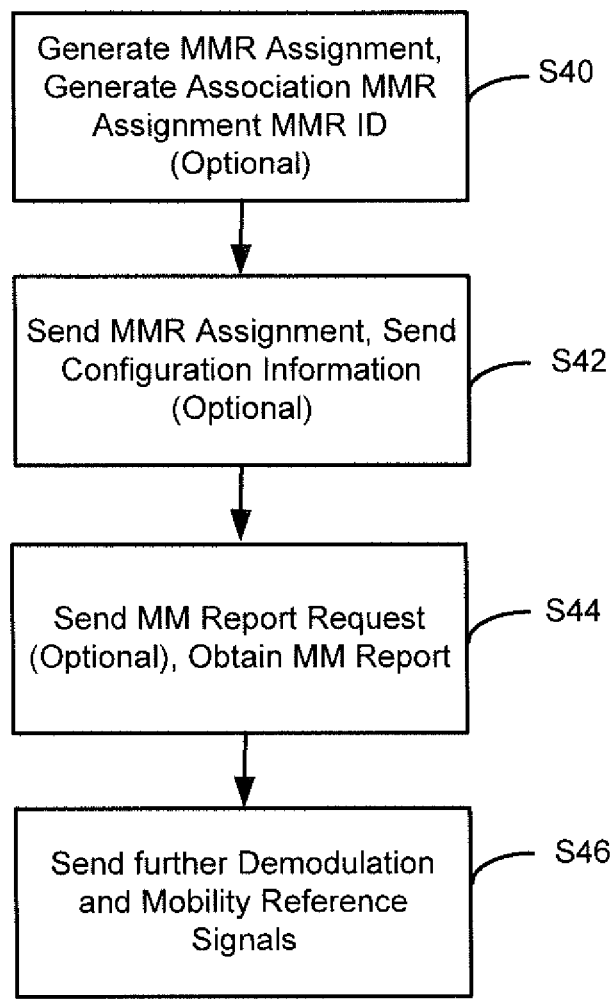
FIG. 11 shows a flowchart of operation for the network node shown in FIG. 10A, 10B, in particular with respect to performing a mobility measurement in the wireless device.

FIG. 11 shows a flowchart of operation for the network node shown in FIG. 10, in particular with respect to performing a mobility measurement in the wireless device, e.g. the wireless device 10, UE.

As shown in FIG. 11, the method in the network node 52 comprises a step S40, operated by the memory 58 in corporation with the processor(s) 56 or by the generating module 60, to generate a mobility measurement resource assignment identifying one or more demodulation and mobility reference signals of a pre-determined set of demodulation and mobility reference signals RS.

As shown in FIG. 11, the method in the network node 52 comprises a step S42, operated by the memory 58 in corporation with the processor(s) 56 or by the sending module 62, respectively, to send the mobility measurement resource assignment to at least one wireless device operating in the radio access network, the mobility measurement resource assignment being modulated with the one or more demodulation and mobility reference signals of the pre-determined set.

In some embodiments, the mobility measurement resource assignment and the one or more demodulation and mobility reference signals of the pre-determined set are sent together in a beam, wherein the mobility measurement resource assignment schedules the at least one wireless device to determine one or more mobility measurement quality values.

As shown in FIG. 11, in the step S40, operated by the memory 58 in corporation with the processor(s) 56 or by the generating module 60, respectively, there is also generated an association between the mobility measurement resource assignment and a mobility measurement identity to associate the mobility measurement identity with a mobility measurement report. Thus it is possible to indicate the mobility measurement identity in the mobility measurement resource assignment. The association can be static or changes over time, i.e. semi-static, meaning configurable by configuring the search space.

In some embodiments, the mobility measurement identity represents a physical mobility measurement identity or the mobility measurement identity represents a logical mobility measurement identity assigned by the network node.

In some embodiments, the mobility measurement identity is indicated in the mobility measurement resource assignment by including the mobility measurement identity in the mobility measurement resource assignment.

In some embodiments, transmission between the radio access network and the wireless device uses radio resources defined in a time domain and in a frequency domain, wherein the mobility resource assignment is sent within a search space for the wireless device, the search space corresponding to a subset of the radio resources, wherein the search space is configured as one of the group consisting of
  a search space for receipt of control data on a downlink control channel,
  a search space for receipt of control data and payload data on a downlink data channel, and
  a search space for receipt of receipt of mobility measurement resource assignments, the search space being different from a search space for receipt of control data assigning one or more radio resources for transmission and/or receipt of payload data.

As shown in FIG. 11, the method in the network node 52 comprises in the step S42, operated by the memory 58 in corporation with the processor(s) 56 or by the sending module 62, respectively, a sending of configuration information to the at least one wireless device prior to initiation of sending the mobility measurement resource assignment, the configuration information specifying a search space corresponding to a subset of the radio resources in such a way that a location of a subspace in the search space is associated with the one or more mobility measurement identities, wherein the plurality of mobility measurement identities are related to the case of grouping of mobility measurement identities.

As shown in FIG. 11, the method in the network node 52 comprises a step S44, operated by the memory 58 in corporation with the processor(s) 56 or by the quality reporting module 64, respectively, to obtain or receive a mobility measurement report from the at least one wireless device, the mobility measurement report indicating one or more mobility measurement quality values and indicating the mobility measurement identity.

As shown in FIG. 11, the method in the network node 52 comprises in the step S44, operated by the memory 58 in corporation with the processor(s) 56 or by the quality reporting module 64, respectively, an optional sending of a mobility measurement report request to the at least one wireless device, wherein the mobility measurement report is received in response to the mobility measurement report request.

In some embodiments, the mobility measurement resource assignment identifies one or more further demodulation and mobility reference signals of a further pre-determined set of demodulation and mobility reference signals. Here, network node 30 sends one assignment for two beams with corresponding RS1, RS2; the second beam is not sent from network node 30, e.g., according to the co-operating case.

As shown in FIG. 11, the method in the network node 52 comprises in the step S44, operated by the memory 58 in corporation with the processor(s) 56 or by the sending module 62, respectively, to send the one or more further demodulation and mobility reference signals of the further set of pre-determined demodulation and mobility references signals to the wireless device in a further beam different from the beam via which the mobility measurement resource assignment.

Figure 12:
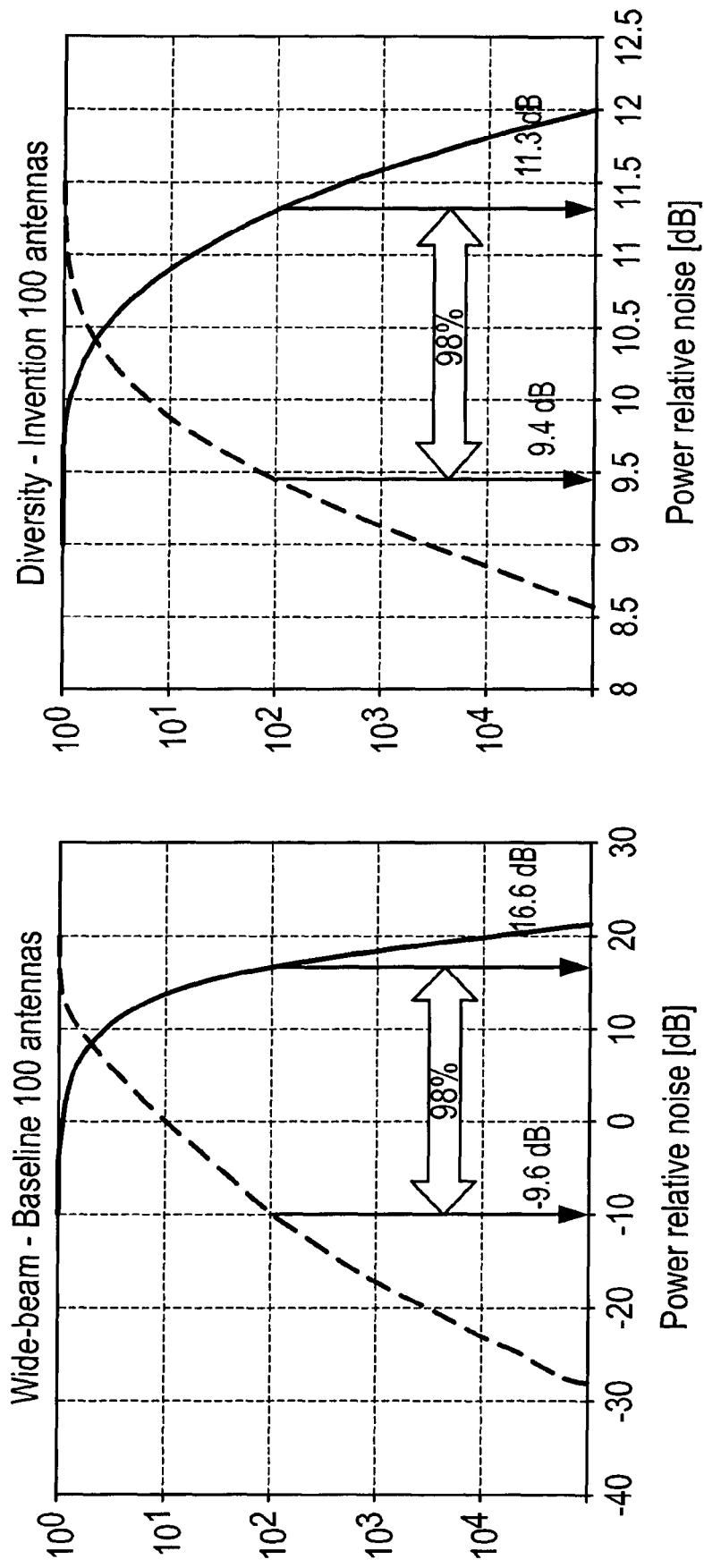
FIG. 12 shows a use case for the mobility measurement according to embodiments of the present invention.

FIG. 12 shows a use case for the mobility measurement according to embodiments of the present invention. Specifically, a probability that a measurement is above respectively below a certain Signal to Noise Ratio SRN value (dotted and solid curves) is shown dependent on a power relative noise in units of dB for a prior art wide beam baseline with 100 antennas (left figure) and for a diversity application with 100 antennas according to some embodiments of the present invention (right figure). The uncertainty in mobility measurements is decreased significantly if power is distributed over independent diversity branches, e.g. the symmetrical 98% interval drops from 26 dB to 2 dB. Observe that that the difference might be smaller with different assumptions but still be significant.

As mentioned above one problem with one shot mobility measurements is that fast-fading variations can strongly influence the mobility measurements. Therefore in a preferred embodiment the transmission and hence the measurement may support the option to have high diversity order. Currently the exact relation between the fast-fading properties and the gain of a beam-formed signal is unknown. In these examples we therefore in this description assume a wide beam solution as baseline, with Rayleigh fading both for the base-line and the proposed invention. Both schemes are assumed to use a small resource—within a coherence block e.g. giving no frequency/time dependent information—using matched filter channel estimation. The intrinsic SNR after matched filter is set to 10 dB for illustration purposes. Further it is assumed that the power-radiation pattern is the same for the wide-beam and each diversity branch.

It should be noted that for the wide-beam solution the wireless device can potentially get more spatial channel information e.g. beam-forming direction.

As shown in FIG. 12, the cost of this knowledge is a loss of diversity which results in much higher variation in the estimated path-gain, for a wide-beam solution the path-gain estimate is within [−9.6 16.6] dB with 98% probability which is much larger span compared to the diversity scheme were the interval is quite narrow at [9.4 11.3] dB. It should be noted here that the higher processing gain for wide-beam gives more noise suppression and hence lower received power and hence higher SINR on the channel estimate for a given value of received power enabling more channel knowledge.

The benefit with an embodiment using a diversity based transmission format is that even if one intend to acquire detailed channel knowledge it is better to first limit this procedure to the correct transmission point. But in some embodiments of the present invention, the described concepts are used in a narrow beam e.g. when a very restricted uptake area is targeted for the mobility measurement. Hence before a lot of resources is spent to obtain channel knowledge it is suggested to first accurately decide for which transmission point channel knowledge should be acquired. If the estimated path-gain in the legacy wide-beam signal is used for a single measurement opportunity this would come along with the risk of picking the wrong transmission point (20 dB errors will occur) for, e.g. a beam-scanning procedure. In legacy systems such as LTE the latter is avoided by averaging over time, e.g. multiple measurements on CRS in LTE, but with a single measurement opportunity time diversity is not possible. In other words, in legacy systems such as LTE, a good path-gain for a legacy wide beam can be obtained by means of time diversity of measurements, hence averaging measurements over time, while in 5G scenarios in which reference signals are expected to be not constantly transmitted a good path-gain would be obtained by employing measurements at one time instance for multiple beams.

Further, the added benefit is that the control message comprising the data symbols and transmitted together with the pilots used here can be link-adapted with much smaller fading margin using embodiments according to embodiments of the invention e.g. around 10 dB smaller fading margin due to the diversity. This is due to that the average energy collected only varies, for example, over a 2 dB range instead of a 26 dB range and the link-adaptation must consider, for example 10% error probability that is close to the 10% SNR which is around 0 dB without high diversity and 10 dB with high diversity as seen in FIG. 12. Observe that the actual gain will be smaller than a factor of 10 dB due to the less efficient diversity format. The link adaptation is then adapted to the area for which the network wants mobility measurements, e.g. in a dense deployment less overhead is used but in rural areas more overhead is needed for a larger coverage area. This is important as this implies that the high number of needed reference signals is offset by less needed fading margin, hence interference can be offset using longer sequences than used in the example below for the diversity format without additional overhead at a particular BLER if you want to measure for neighboring nodes without needing any coordination scheme to avoid interference.

As further use example of the present invention is related to measurement identity inter-node coordination.

In this use example of the invention a mobility search space is shared in-between nodes that want to support inter-node mobility. In said search space the origin of a mobility measurement is maintained by coordinating the identities for mobility messages within a shared set, either semi-statically or dynamically. It is to be observed that if a network node can have different beam-forming etc. for different transmissions of MMR assignment messages and hence the used e.g. beam-former respectively precoder can be coded into the mobility measurement identity. Observe further that a wireless device can have multiple inter-node measurements groups in its mobility measurement search space and in that case the position of the message in the search space can be an implicit coding of parts of the mobility message identity.

As further use example of the present invention is related to spatial reuse optimized mobility measurements and load sharing.

In some embodiment of the present invention, a first rough selection using diversity is done, but here it is described how embodiments of the present invention can be used to do spatial reuse optimization and load sharing. In such an embodiment a transmission point, e.g., a network node of the radio access network, detects that it has the ability to serve more traffic in some spatial direction. For example, a transmission point using a grid-of-beams solution detects that it has an unused spatial direction, e.g., one beam without any users in adjacent beams. In this beam the transmission point transmits a mobility transmission with a specific identity. The transmission point requests neighboring nodes (e.g. with wireless devices in the current mobility search space) to report if any wireless device reports a measurement for said identity, thus enabling said two nodes to do a load sharing decision for any wireless device that could be served in said beam with low load.

The invention claimed is:

1. A method of performing a mobility measurement in a wireless device operating in a radio access network, the method comprising:
receiving a mobility measurement resource assignment identifying one or more demodulation and mobility reference signals of a pre-determined set of demodulation and mobility reference signals (RS);
demodulating the mobility measurement resource assignment using the one or more demodulation and mobility reference signals of the pre-determined set of demodulation and mobility reference signals; and
determining one or more mobility measurement quality values from the identified one or more demodulation and mobility reference signals.

2. The method of claim 1:
wherein the mobility measurement resource assignment and the pre-determined set of demodulation and mobility reference signals are received together in a beam, and
wherein the mobility measurement resource assignment schedules the wireless device to determine the one or more mobility measurement quality values.

3. The method of claim 1:
wherein the mobility measurement resource assignment indicates a mobility measurement identity;
further comprising obtaining an association between the mobility measurement resource assignment and the indicated mobility measurement identity to associate the mobility measurement identity with the one or more mobility measurement quality values.

4. The method of claim 3:
wherein the mobility measurement resource assignment includes the mobility measurement identity; and
wherein the association is obtained by extracting the mobility measurement identity from the mobility measurement resource assignment.

5. The method of claim 3, further comprising:
obtaining an association between the indicated mobility measurement identity and the one or more mobility measurement quality values; and/or
sending a mobility measurement report to the radio access network, the mobility measurement report indicating the determined one or more mobility measurement quality values and indicating the mobility measurement identity.

6. The method of claim 5, further comprising receiving a mobility measurement report request from the radio access network, wherein the mobility measurement report is sent in response to the mobility measurement report request.

7. The method of claim 6, further comprising:
receiving configuration information prior to receiving the mobility measurement resource assignment, the configuration information specifying an association between a mobility measurement identity and a beam identity;
wherein the mobility measurement report request includes a beam identity;
further comprising relating the received beam identity with the associated mobility measurement identity using the association between the mobility measurement identity and the beam identity to obtain a related mobility measurement identity;
wherein the sent mobility measurement report includes the one or more mobility measurement quality values associated with the related mobility measurement identity.

8. The method of claim 3:
wherein mobility measurement identities are grouped into a mobility measurement group;
wherein the wireless device supports a mobility measurement group; and
wherein the assignment of a received mobility measurement resource assignment to the mobility measurement group is implicit by means of receiving the mobility measurement resource assignment in a subspace of the search space.

9. The method of claim 1:
wherein transmission between the radio access network and the wireless device uses radio resources defined in a time domain and in a frequency domain;
wherein the wireless device is configured with a search space for receipt of the mobility measurement resource assignment, the search space corresponding to a subset of the radio resources;
wherein the search space is configured as one of the group consisting of:
a search space for receipt of control data on a downlink control channel;
a search space for receipt of control data and payload data on a downlink data channel; and/or
a search space for receipt of mobility measurement resource assignments, the search space being different from a search space for receipt of control data assigning one or more radio resources for transmission and/or receipt of payload data.

10. The method of claim 9:
wherein the mobility measurement resource assignment indicates a mobility measurement identity;
further comprising obtaining an association between the mobility measurement resource assignment and the indicated mobility measurement identity to associate the mobility measurement identity with the one or more mobility measurement quality values;
wherein the association between the mobility resource assignment and the mobility measurement identity is obtained by extracting the mobility measurement identity based on a location of a subspace in the search space, in which subspace the mobility measurement resource assignment is received.

11. The method of claim 10, further comprising receiving configuration information prior to receiving the mobility measurement resource assignment, the configuration information specifying the search space in such a way that the location of the subspace in the search space is associated with the mobility measurement identity.

12. The method of 9:
wherein the mobility measurement resource assignment indicates a mobility measurement identity;
further comprising obtaining an association between the mobility measurement resource assignment and the indicated mobility measurement identity to associate the mobility measurement identity with the one or more mobility measurement quality values;
wherein the mobility measurement resource assignment includes a parameter value specifying partly the search space; and
wherein the association between the mobility resource assignment and the mobility measurement identity is obtained by extracting the mobility measurement identity from a location of a subspace in the search space specified by the parameter value.

13. The method of claim 1:
wherein the mobility measurement resource assignment identifies one or more further demodulation and mobility reference signals of a further pre-determined set of demodulation and mobility reference signals;
wherein the method further comprises:
receiving one or more further demodulation and mobility reference signals of a further pre-determined set of demodulation and mobility reference signals;
demodulating the mobility measurement resource assignment using the one or more further demodulation and mobility reference signals of the further pre-determined set of demodulation and mobility reference signals; and
determining one or more further mobility measurement quality values from the identified one or more demodulation and mobility reference signals of the further pre-determined set of demodulation and mobility reference signals.

14. The method of claim 13:
wherein the mobility measurement resource assignment and the one or more demodulation reference signals of the pre-determined set are received from a first network node; and
wherein the one or more further demodulation and mobility reference signals of the further pre-determined set are received from the first network node or from a second, different network node.

15. The method of claim 1, further comprising:
receiving a further mobility measurement resource assignment identifying one or more further demodulation and mobility reference signals of a further pre-determined set of demodulation and mobility reference signals;
demodulating the further mobility measurement resource assignment using the one or more demodulation and mobility reference signals of the further pre-determined set of demodulation and mobility reference signals; and
determining one or more further mobility measurement quality values from the identified one or more further demodulation and mobility reference signals of the further pre-determined set of demodulation and mobility reference signals.

16. The method of claim 1, wherein the wireless device is per-configured to use the one or more demodulation and mobility reference signals for the demodulation of the mobility resource assignment.

17. A method in a network node of a radio access network, the method comprising:
generating a mobility measurement resource assignment identifying one or more demodulation and mobility reference signals of a pre-determined set of demodulation and mobility reference signals; and
sending the mobility measurement resource assignment to at least one wireless device operating in the radio access network, the mobility measurement resource assignment being modulated with the one or more demodulation and mobility reference signals of the pre-determined set.

18. The method of claim 17:
wherein the mobility measurement resource assignment and the one or more demodulation and mobility reference signals of the pre-determined set are sent together in a beam; and
wherein the mobility measurement resource assignment schedules the at least one wireless device to determine one or more mobility measurement quality values.

19. A wireless device for performing mobility measurement, the wireless device being adapted to operate in a radio access network, the wireless device comprising:
at least one interface to establish a transmission link;
processing circuitry;
memory containing instructions executable by the processing circuitry whereby the wireless device is operative to:
receive a mobility measurement resource assignment identifying one or more demodulation and mobility reference signals of a pre-determined set of demodulation and mobility reference signals;
demodulate the mobility measurement resource assignment using the one or more demodulation and mobility reference signals of the pre-determined set of demodulation and mobility reference signals; and
determine one or more mobility measurement quality values from the identified one or more demodulation and mobility reference signals.

20. A network node for a radio access network, comprising:
at least one interface to establish a transmission link;
processing circuitry;
memory containing instructions executable by the processing circuitry whereby the network node is operative to:
generate a mobility measurement resource assignment identifying one or more demodulation and mobility reference signals of a pre-determined set of demodulation and mobility reference signals; and send the mobility measurement resource assignment to at least one wireless device operating in the radio access network, the mobility measurement resource assignment being modulated with the one or more demodulation and mobility reference signals of the pre-determined set.

* * * * *